US010757774B1

(12) United States Patent
Mu et al.

(10) Patent No.: US 10,757,774 B1
(45) Date of Patent: Aug. 25, 2020

(54) CURRENT ADJUSTMENT CIRCUIT

(71) Applicant: MAXIC TECHNOLOGY CORPORATION, Beijing (CN)

(72) Inventors: Zaixin Mu, Beijing (CN); Pan Zhang, Beijing (CN); Baohong Cheng, Beijing (CN); Liusheng Liu, Beijing (CN)

(73) Assignee: MAXIC TECHNOLOGY CORPORATION, Beijing (CN)

( * ) Notice: Subject to any disclaimer, the term of this patent is extended or adjusted under 35 U.S.C. 154(b) by 0 days.

(21) Appl. No.: 16/695,108

(22) Filed: Nov. 25, 2019

(30) Foreign Application Priority Data

Aug. 8, 2019 (CN) .......................... 2019 1 0729518
Aug. 12, 2019 (CN) .......................... 2019 1 0740259
Aug. 12, 2019 (CN) .......................... 2019 2 1302937

(51) Int. Cl.
*H05B 45/10* (2020.01)
*H05B 45/37* (2020.01)

(52) U.S. Cl.
CPC ............. *H05B 45/10* (2020.01); *H05B 45/37* (2020.01)

(58) Field of Classification Search
CPC ........ H05B 37/02; H05B 33/08; H05B 45/00; H05B 45/10; H05B 45/37; H05B 47/00
See application file for complete search history.

(56) References Cited

U.S. PATENT DOCUMENTS 8,970,135 B2 * 3/2015 Zheng ............... H02M 3/33523
315/308
2015/0077009 A1 * 3/2015 Kunimatsu ............ H05B 45/37
315/224

* cited by examiner

Primary Examiner — Jimmy T Vu
(74) Attorney, Agent, or Firm — Metis IP LLC

(57) ABSTRACT

The present disclosure provides a current adjustment circuit. The current adjustment circuit includes a lighting sub-circuit, a dimming switch disposed in the lighting sub-circuit, a switch control sub-circuit connected to the dimming switch and the lighting sub-circuit, and a time control sub-circuit connected to the switch control sub-circuit. Time of switch-off period in a switching cycle of the current adjustment circuit is adjusted under control of the time control sub-circuit and the switch control sub-circuit. Brightness of the current adjustment circuit is adjusted based on the output current of the current adjustment circuit. The present disclosure may reduce or even eliminate influence of factors such as circuit parasitic parameters on an LED light source, ensure consistency of each light source, and optimize display effect of the LED light source.

20 Claims, 9 Drawing Sheets

CURRENT ADJUSTMENT CIRCUIT

CROSS-REFERENCE TO RELATED APPLICATION

This application claims priority to Chinese Patent Application No. 201910729518.1 filed on Aug. 8, 2019, Chinese Patent Application No. 201921302937.9 filed on Aug. 12, 2019, and Chinese Patent Application No. 201910740259.2 filed on Aug. 12, 2019, the contents of which are incorporated herein by reference in their entirety.

TECHNICAL FIELD

The present disclosure relates to the field of an electrical circuit, in particular relates to a current adjustment circuit.

BACKGROUND

LED (light-emitting diode) light source is a light source based on a light-emitting diode. The LED light source has a plurality of advantages, such as, supporting low-voltage power supply, low energy consumption, wide applicability, high stability, short response time, no harm upon the environment, and multi-colors light emission. With continuous development of LED technology, LED light sources have been widely used in shopping malls, factories, and housings. The LED light sources are used for lighting or decoration, and brightness of the LED light sources is adjusted according to user needs. Normally, the LED is driving by a constant current, its brightness varies with the current flow through the LED string.

Driving methods of LED light source mainly include CCM (Continuous Conduction Mode) and DCM (Discontinuous Conduction Mode). In CCM dimming, the current of an inductor does not reach zero during one switching cycle, that is, the inductor does not "reset". Cost of the CCM dimming is high and the CCM dimming is difficult to be controlled for an inductor saturation is prone to occur. In DCM dimming, current of an inductor is properly reset during one switching cycle. The current of the inductor is zero when a power switch is turned on. In traditional DCM dimming, harmonic current is high, and there are too many factors affecting a current of a circuit. The electromagnetic interference is strong. In the case of a plurality of LED light sources are in a circuit, the LED light sources have poor consistency, resulting in a large difference between dimming effects of the LED light sources. Therefore, how to effectively adjust brightness of a light and enhance the consistency of LED light sources has become an urgent problem to be solved.

SUMMARY

The present disclosure provides a current adjustment circuit, the current adjustment circuit adjusts a switch-on state based on adjusting a zero-crossing phase of the current adjustment circuit. The zero-crossing phase of the current adjustment circuit is adjusted based on a time control sub-circuit and a switch control sub-circuit. The current adjustment circuit eliminates influence of parasitic parameters of a driving circuit on LED output current, ensures consistency of each light source, and optimize display effect of the LED light source.

According to an aspect of the present disclosure, a current adjustment circuit is provided. The current adjustment circuit includes a lighting sub-circuit, a dimming switch disposed in the lighting sub-circuit, a switch control sub-circuit connected to the dimming switch and the lighting sub-circuit, and a time control sub-circuit connected to the switch control sub-circuit;

the time control sub-circuit is configured to send a trigger signal to the switch control sub-circuit after a first preset time period from a start time of a zero-crossing damped oscillation state of the lighting sub-circuit;

the switch control sub-circuit is configured to turn on the dimming switch based on the trigger signal; and the switch control sub-circuit is configured to turn off the dimming switch after a time period of an energy storage phase from a start time of the dimming switch being turned on.

In some embodiments, the time control sub-circuit is a precision timing circuit for timing or counting turning off time and turning on time of the dimming switch.

In some embodiments, the time control sub-circuit is a charge time sub-circuit, in the energy storage phase of each switching cycle, the charge time sub-circuit is in a first charging state, the dimming switch is in a turn-on state under control of the switch control sub-circuit control, and the lighting sub-circuit is in a switch-on state and perform inductive energy storing;

in an energy release phase following the energy storage phase of each switching cycle, the charge time sub-circuit continues to be in the first charging state, the dimming switch switches to a turn off state under the control of the switch control sub-circuit, and the lighting sub-circuit is in a switch-off state and perform inductive energy releasing; and in a zero-crossing phase following the energy release phase of each switching cycle, the lighting sub-circuit is in the zero-crossing damped oscillation state, the charge time sub-circuit activates a second charging state, and the dimming switch remains in the turn off state under the control of the switch control sub-circuit;

wherein when charging is finished in the second charging state, the charge time sub-circuit sends the trigger signal, the dimming switch is turned on under the control of the switch control sub-circuit, and the current adjustment circuit re-enters the energy storage phase after the charge time sub-circuit is discharged.

In some embodiments, an input end of the charge time sub-circuit is connected to a control end of the dimming switch, an output end of the charge time sub-circuit is connected to a first input end of the switch control sub-circuit, a second input end of the switch control sub-circuit is connected to an output end of the dimming switch, and an output end of the switch control sub-circuit is connected to the control end of the dimming switch.

In some embodiments, in the energy storage phase of each switching cycle, the charge time sub-circuit sends the trigger signal to the switch control sub-circuit, the dimming switch is in the turn-on state under the control of the switch control sub-circuit based on the trigger signal, and an electrical signal of a connection point of the switch control sub-circuit and the lighting sub-circuit is in a state of gradual increase;

when the electrical signal of the connection point increases to a threshold voltage, the dimming switch may switches to the turn off state under the control of the switch control sub-circuit trigged by the electrical signal of the connection point, the current adjustment circuit enters the energy release phase, and the electrical signal of the connection point is zero state; and after an inductive energy releasing of the lighting sub-circuit is finished, the current adjustment circuit enters the zero-crossing phase and is in the zero-crossing damped oscillation state, the charge time sub-circuit activates the second charging state, the charge time sub-circuit sends the trigger signal to the switch control sub-circuit after the charging is finished in the second charging state, the dimming switch is turned on under the control of the switch control sub-circuit based on the trigger signal, and the current adjustment circuit re-enters the energy storage phase.

In some embodiments, an input end of the charge time sub-circuit is connected to a control end of the dimming switch, an output end of the charge time sub-circuit is connected to a first input end of the switch control sub-circuit, a second input end of the switch control sub-circuit is connected to an output end of the dimming switch, and an output end of the switch control sub-circuit is connected to the control end of the dimming switch.

In some embodiments, in the energy storage phase of each switching cycle, the charge time sub-circuit sends the trigger signal to the switch control sub-circuit, the dimming switch is in the turn-on state under the control of the switch control sub-circuit based on the trigger signal, and an electrical signal of a connection point of the switch control sub-circuit and the lighting sub-circuit is in a state of gradual increase;

when the electrical signal of the connection point increases to a threshold voltage, the dimming switch switches to the turn off state under the control of the switch control sub-circuit trigged by the electrical signal of the connection point, the current adjustment circuit enters the energy release phase, and the electrical signal of the connection point is zero state; and after an inductive energy releasing of the lighting sub-circuit is finished, the current adjustment circuit enters the zero-crossing phase and is in the zero-crossing damped oscillation state, the charge time sub-circuit activates the second charging state, the charge time sub-circuit sends the trigger signal to the switch control sub-circuit after the charging is finished in the second charging state, the dimming switch is turned on under the control of the switch control sub-circuit based on the trigger signal, and the current adjustment circuit re-enters the energy storage phase.

In some embodiments, the current adjustment circuit includes a zero-crossing detector, wherein the charge time sub-circuit includes a first dimming charge branch, a second dimming charge branch, a first comparator, and a signal inverter;

a first input end of the first dimming charge branch is connected to the control end of the dimming switch, a second input end of the first dimming charge branch is connected to the control end of the dimming switch through the zero-crossing detector, and an output end of the first dimming charge branch is connected to a positive input end of the first comparator;

a first input end of the second dimming charge branch is connected to the control end of the dimming switch through the zero-crossing detector, a second input end of the second dimming charge branch is connected to the control end of the dimming switch, and an output end of the second dimming charge branch is connected to a negative input end of the first comparator; and an output end of the first comparator is connected to an input end of the signal inverter, and an output end of the signal inverter is the output end of the charge time sub-circuit and is connected to the first input end of the switch control sub-circuit.

In some embodiments, the first dimming charge branch may include a first flip-flop, a first switch, a first charge capacitor, and an operational amplifier;

a signal input end of the first flip-flop is connected to a current source, and a trigger end of the first flip-flop is the first input end of the first dimming charge branch, a reset end of the first flip-flop is the second input end of the first dimming charge branch, and an output end of the first flip-flop is connected to a control end of the first switch;

an input end of the first switch is connected to the current source, and an output end of the first switch is connected to ground through the first charge capacitor; and a positive input end of the operational amplifier is connected to the output end of the first switch, a negative input end of the operational amplifier is connected to the output end of the operational amplifier, and an output end of the operational amplifier is the output end of the first dimming charge branch.

In some embodiments, the second dimming charge branch includes a second flip-flop, a second switch, and a second charge capacitor;

a signal input end of the second flip-flop is connected to the current source, a trigger end of the second flip-flop is the first input end of the second dimming charge branch, a reset end of the second flip-flop is the second input end of the second dimming charge branch, and an output end of the second flip-flop is connected to a control end of the second switch; and an input end of the second switch is connected to the current source, an output end of the second switch is connected to the ground through the second charge capacitor, and the output end of the second switch is the output end of the second dimming charge branch.

In some embodiments, the switch control sub-circuit may include a second comparator, a third flip-flop, and a driver;

the electrical signal of the connection point is received by the second comparator through the positive input end of the second comparator by connecting to the output end of the dimming switch, and the negative input end of the second comparator is connected to the threshold voltage signal, an output end of the second comparator is connected to a first input end of the third flip-flop; and a second input end of the third flip-flop is connected to the output end of the charge time sub-circuit, an output end of the third flip-flop is connected to the driver, and an output end of the driver is connected to the control end of the dimming switch.

In some embodiments, in the energy storage phase, a first level signal is outputted by the output end of the first flip-flop triggered by the trigger signal from the control end of the dimming switch, the first charge capacitor is charged by closing the first switch, a voltage signal of the first charge capacitor is received by the operational amplifier and an equipotential signal is outputted by the operational amplifier, wherein the equipotential signal is equal to the voltage signal of the first charge capacitor in magnitude, and the equipotential signal may increase during a charging process of the first capacitor until the charging process is finished and a potential signal of the first charge capacitor is held, a level signal output by the first dimming charge branch is equal to the equipotential signal, and the second dimming charge branch is turned off in this state, when the electrical signal of the connection point rises to a threshold voltage of the current adjustment circuit, the second comparator outputs a high-level signal, and the output end of the third flip-flop outputs a low-level driving signal under the control of the high-level signal, the driver controls the dimming switch to be turned off under the control of the low level driving signal to cause the current adjustment circuit to enter the energy release phase; and after energy of the energy storage inductor is released, the zero-crossing detector outputs the trigger signal and the current adjustment circuit enters the zero-crossing phase, an output end of the second flip-flop outputs a second level signal under the trigger end of the second flip-flop is triggered by the trigger signal, the second switch is turned on under control of the second level signal, the second charge capacitor is charged, the second charging branch is a charging phase that is a representation of an end of the first charging state and a start of the second charging state; the second dimming charge branch is turned on and outputs a level signal until the charging of the second charge capacitor is finished, wherein the level signal outputted by the second dimming charge branch is equal to a voltage signal of the second charge capacitor in magnitude, when the level signal outputted by the second dimming charge branch is larger than the level signal outputted by the first dimming charge branch, an output end of the first comparator outputs a low-level signal, the output end of the signal inverter outputs a high-level signal, the second input end of the third flip-flop receives the high-level signal outputted by the signal inverter and outputs a high-level driving signal, the dimming switch switches to be turned on under the control of the driver, wherein the driver is drivered by the high-level driving signal, thereby the current adjustment circuit enters an energy storage phase of a next switching period.

In some embodiments, the first switch and the second switch are P-type field effect transistor, and the first level signal and the second level signal is low-level signals.

In some embodiments, the second charge capacitor may include a plurality of capacitor branches arranged in parallel and an encoder;

each of the capacitor branches may comprise a branch capacitor and a branch switch, one end of the branch capacitor is connected to ground, and the other end of the branch capacitor is connected to the output end of the second switch through the branch switch;

the encoder is connected to a branch switch in each of the capacitor branches, and the encoder is used to control a capacitance of the second charge capacitor by controlling disconnection and/or connection of the branch switch in each of the capacitor branches.

In some embodiments, the charge time sub-circuit may further include a discharge sub-circuit, the discharge sub-circuit includes a controller, a third switch, and a fourth switch;

an input end of the controller is connected to the control end of the dimming switch, and an output end of the controller is respectively connected to a control end of the third switch and a control end of the fourth switch;

an input end of the third switch is connected to a connection point of the output end of the first switch and a first end of the first charge capacitor, and an output end of the third switch is connected to a connection point of a second end of the first charge capacitor and the ground; and an input end of the fourth switch is connected to a connection point of the output end of the second switch and a first end of the second charge capacitor, and an output end of the fourth switch is connected to a connection point of the second end of the second charge capacitor and the ground.

In some embodiments, at an end of each switching cycle, when the dimming switch is switched from a turned-off state to a turned-on state, the third switch and the fourth switch is turned on under control of the controller, voltages in the first dimming charge branch and the second dimming charge branch is instantly equal to zero by discharging the first charge capacitor and the second charge capacitor.

In some embodiments, the lighting sub-circuit comprises a rectifier, a light source, a diode, an energy storage inductor, a filter capacitor, and a current sensing resistor;

a first end of the light source is connected to the rectifier, a second end of the light source is connected to a first end of the energy storage inductor, a second end of the energy storage inductor is connected to the input end of the dimming switch, and the output end of the dimming switch is grounded through the current sensing resistor;

a light source may be a light-emitting diode and/or a plurality of light-emitting diodes connected in series.

a negative end of the diode is connected to the first end of the light source, and a positive end of the diode is connected to the second end of the energy storage inductor; and two ends of the filter capacitor are respectively connected to the first end and the second end of the light source.

Compared with prior arts of an LED lighting circuit, embodiments of the present disclosure provided a current adjustment circuit, which may control switching cycle by adjusting a zero-crossing phase in the switching cycle of the current adjustment circuit. The zero-crossing phase is controlled by setting a time control sub-circuit and a switch control sub-circuit. The current adjustment circuit of the present disclosure ensures consistency of each light source and optimizes display effect of an LED light source using the current adjustment circuit.

In order to make the objects, features, and advantages of the present disclosure more apparent, some exemplary embodiments are described below in conjunction with some reference drawings.

BRIEF DESCRIPTION OF THE DRAWINGS

The present disclosure is further described in terms of an exemplary embodiment. These exemplary embodiments are described in detail with reference to the drawings. These embodiments are non-limiting exemplary embodiments, in which like reference numerals represent similar structures throughout the several views of the drawings. For any person of the skilled in the art, other relevant drawings are obtained according to these drawings without any creative work.

DETAILED DESCRIPTION

Figure 1:
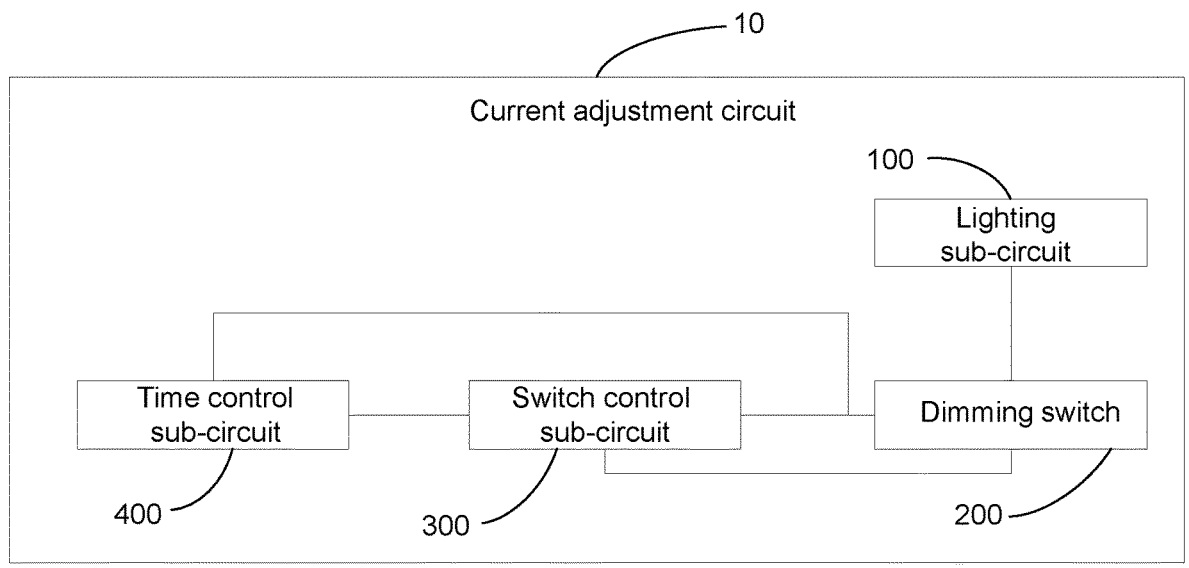
FIG. 1 is a schematic structural diagram illustrating an exemplary current adjustment circuit according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, steps, elements, and/or components, but do not preclude the presence or addition of one or more other features, integers, steps, steps, elements, components, and/or groups thereof.

These and other features, and characteristics of the present disclosure, as well as the methods of step and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

In order to make objectives, technical solutions, and advantages of the present disclosure more apparent, the technical solutions in the present disclosure will be clearly and completely described below in conjunction with reference drawings in the present disclosure. It is apparent that the described embodiments are only a part of the embodiments of the present disclosure, and not all of them. The components in embodiments of the present disclosure, which are generally described and illustrated in the figures herein, may be arranged and designed in a variety of different configurations. Therefore, detailed description of the embodiments of the present disclosure, which is provided in the reference drawings, is not intended to limit the scope of the present disclosure, but only the selected embodiments of the present disclosure. Based on the embodiments of the present disclosure, each of the other embodiments obtained by those skilled in the art without creative efforts shall be bound to the scope of the present disclosure.

LED (light-emitting diode) light source is a light source based on a light-emitting diode. The LED light source may have a plurality of advantages, such as, supporting low-voltage power supply, low energy consumption, wide applicability, high stability, short response time, no harm upon the environment, and multi-colors light emission. With continuous development of LED technology, LED light sources have been widely used in shopping malls, factories, and housings. The LED light sources are used for lighting or decoration, and brightness of the LED light sources is adjusted according to user needs. Driving methods of an LED light source may include CCM (Continuous Conduction Mode) and DCM (Discontinuous Conduction Mode). In CCM dimming, current of an inductor may not reach zero during one switching cycle, that is, the inductor does not "reset". Cost of the CCM dimming is high and the CCM dimming is difficult to be controlled for an inductor saturation is prone to occur. In DCM dimming, current of an inductor is properly reset during one switching cycle. The current of the inductor is zero when a power switch is turned on. In traditional DCM dimming, harmonic current is high, and there are too many factors affecting a current of a circuit. The electromagnetic interference is strong. In the case of a plurality of LED light sources are in a circuit, the LED light sources may have poor consistency, resulting in a large difference between dimming effects of the LED light sources. Therefore, how to effectively adjust brightness of a light and enhance the consistency of LED light sources has become an urgent problem to be solved.

Embodiments of the present disclosure provide a current adjustment circuit for an LED light source of which a switching cycle is controllable. The switching cycle of the current adjustment circuit is controlled by adjusting a zero-crossing period in the switching cycle under a control of a time control sub-circuit and a switch control sub-circuit. Influence of parasitic parameters on the LED light source is reduced. Consistency of each LED light source in the current adjustment circuit is enhanced. Display effect of an LED light source is optimized.

FIG. 1 is a schematic structural diagram illustrating an exemplary current adjustment circuit 10 according to some embodiments of the present disclosure. As shown in FIG. 1, the current adjustment circuit 10 includes a lighting sub-circuit 100, a dimming switch 200, a switch control sub-circuit 300, and a time control sub-circuit 400. The dimming switch 200 is disposed in the lighting sub-circuit 100. The switch control sub-circuit 300 is respectively connected to the dimming switch 200 and the lighting sub-circuit 100. The time control sub-circuit 400 is connected to the switch control sub-circuit 300. The time control sub-circuit 400 is connected to the dimming switch 200.

The time control sub-circuit 400 is configured to send a trigger signal to the switch control sub-circuit 300 after a first preset time period from a start time of a zero-crossing damped oscillation state of the lighting sub-circuit. The zero-crossing damped oscillation state may also refer to a zero-crossing state. The trigger signal is used for turning on the dimming switch 200. The dimming switch 200 is turned on according to the trigger signal under the control of the switch control sub-circuit 300.

The dimming switch 200 is turned off under the control of the switch control sub-circuit 300 after $T_{dmg}$ from a start time of the dimming switch being turned on. The average current in the lighting sub-circuit 100 is adjusted based on switch-on (i.e., conduction) and switch-off (i.e., non-conduction) times of the lighting sub-circuit 100. The switch-on and switch-off times of the lighting sub-circuit 100 is controlled based on the time of $T_{ON}$, $T_{dmg}$, and $T_{OFF}$.

Figure 3:
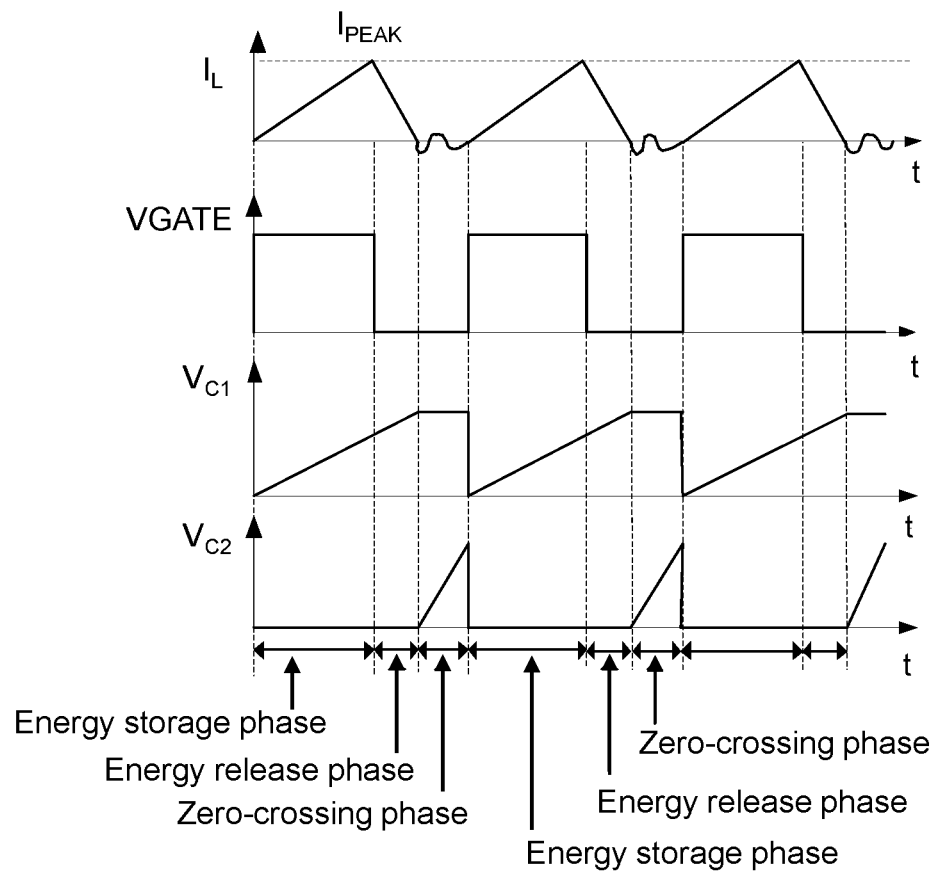
FIG. 3 is a timing diagram illustrating some current nodes and voltage nodes of an exemplary current adjustment circuit according to some embodiments of the present disclosure.

FIG. 3 is a timing diagram illustrating some current nodes and voltage nodes of an exemplary current adjustment circuit 10 according to some embodiments of the present disclosure. Since in a (Discontinuous Conduction Mode)

DCM dimming mode, one problem addressed to be solved is how to control an average current in the current adjustment circuit 10 based on controlling the time of a non-current phase (i.e., a zero-crossing phase). The present disclosure provides a method of controlling the average current by controlling a ratio of time of a current phase (i.e., an energy storage phase and an energy release phase) and time of the non-current phase (i.e., the zero-crossing phase) of the current adjustment circuit.

Here are some embodiments of the present disclosure. It should be understood that the following description of the present disclosure is only some examples of exemplary implementation circuits of the above method. It should be understood that other possible implementations, as long as controlling the average current based on adjusting the time of the current phase and the time of the non-current phase should fall within the method of the present disclosure.

Embodiment 1

Figure 2:
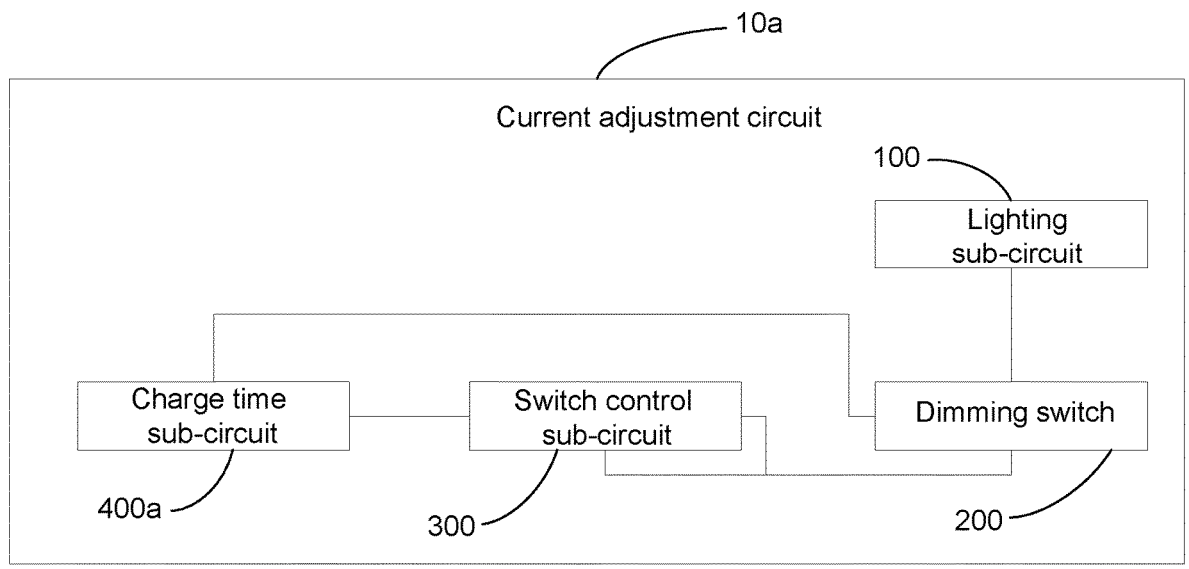
FIG. 2 is a schematic structural diagram illustrating an exemplary current adjustment circuit according to some embodiments of the present disclosure.

FIG. 2 is a schematic structural diagram illustrating an exemplary current adjustment circuit 10a according to some embodiments of the present disclosure. The current adjustment circuit 10a is an embodiment of the current adjustment circuit 10 as shown in FIG. 1. As shown in FIG. 2, a charging control method of the time control sub-circuit 400 is provided. The charge time sub-circuit 400a is an embodiment of the time control sub-circuit 400. Refer to the circuit of FIG. 4 and the timing waveform of FIG. 3, in the DCM dimming mode, an average current of a current adjustment circuit is determined according to the following equation (1):

$$I_{AVG} = \frac{1}{2} \times \frac{V_{REF}}{R} \times \frac{T_{ON} + T_{dmg}}{T}, \quad (1)$$

where $I_{AVG}$ refers to the average current in the current adjustment circuit, $V_{REF}$ refers to a threshold voltage in the current adjustment circuit. In some embodiments of the present disclosure, the threshold voltage is a peak voltage that the current adjustment circuit 10 may reach. R refers to a current sense resistor of the current adjustment circuit.

$$\frac{V_{REF}}{R}$$

refers to a peak current $I_{peak}$ of inductor current $I_L$ of the current adjustment circuit. $T_{ON}$ refers to conduction time (e.g., on time) of the current adjustment circuit in a switching cycle, i.e., time period in an energy storage phase. $T_{dmg}$ refers to time period of an energy release phase of the inductor after the current adjustment circuit is turned off during the switching cycle of the current adjustment circuit. Time of the switching cycle T of the current adjustment circuit is a sum of the time period of the energy storage phase $T_{ON}$, the time period of the energy release phase $T_{dmg}$, and time period of the zero-crossing phase $T_{OFF}$, i.e., $$T = T_{ON} + T_{dmg} + T_{OFF}.$$

Figure 4:
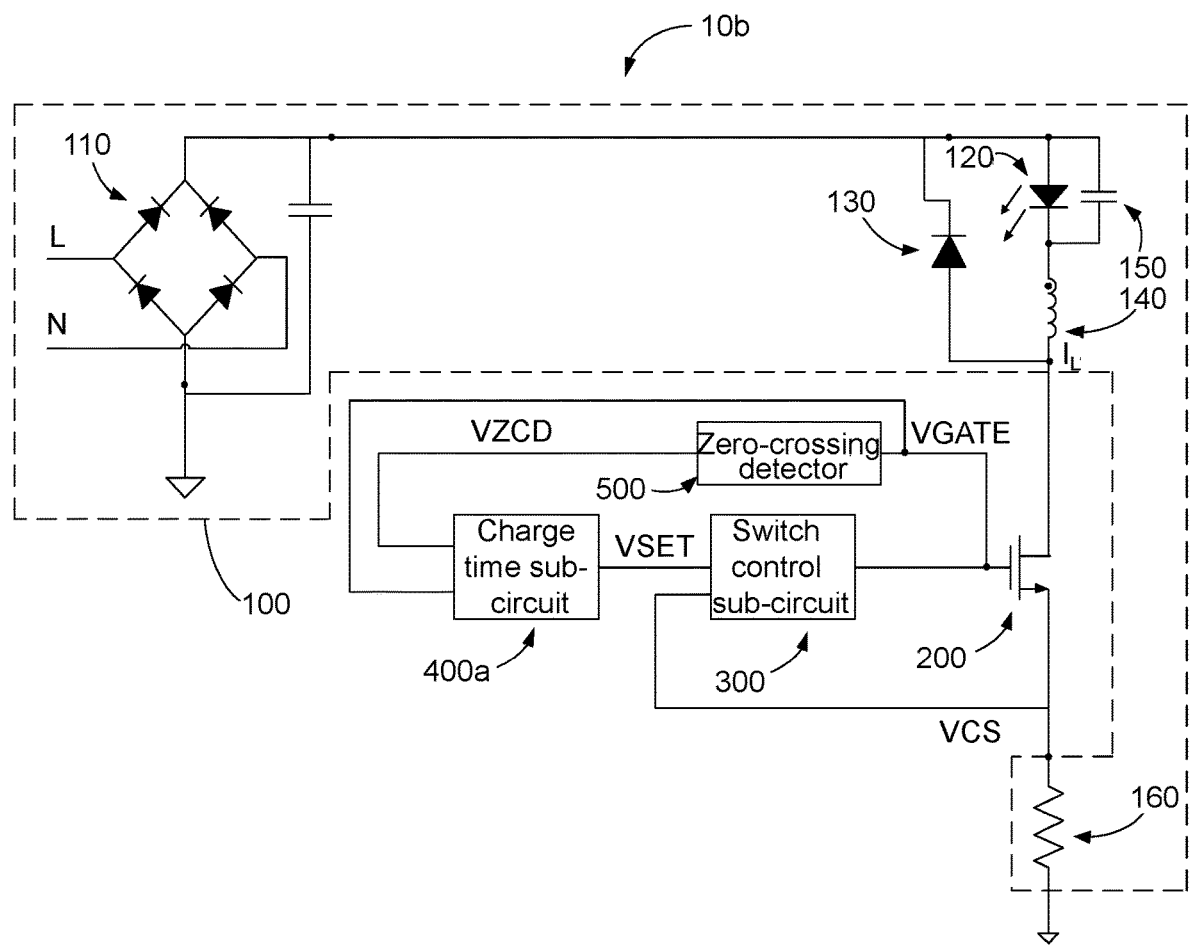
FIG. 4 is a schematic diagram of a circuit structure illustrating an exemplary current adjustment circuit according to some embodiments of the present disclosure.
Figure 7:
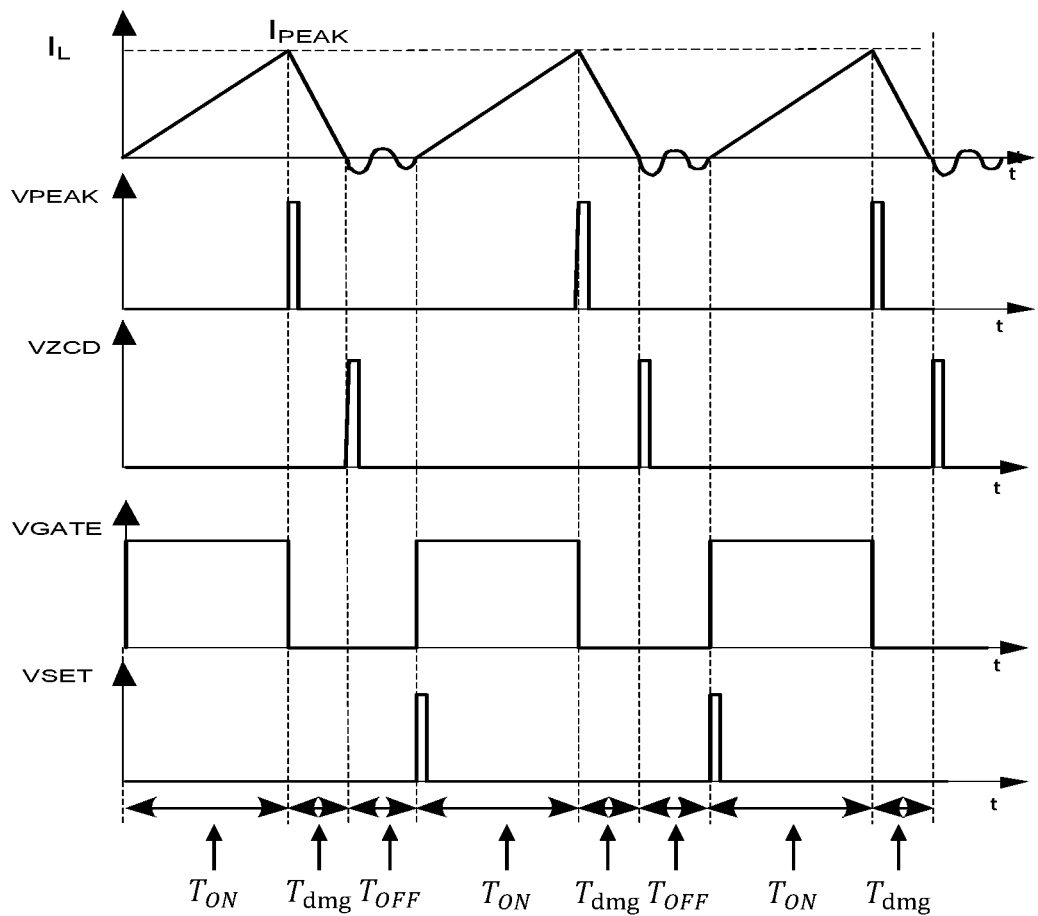
FIG. 7 is a trigger time point of each signal in an exemplary charge time sub-circuit according to some embodiments of the present disclosure.

The inductor current is the current in an energy storage inductor 140 as shown in FIGS. 3-4 and 7. The inductor current is oscillating around zero and/or hold at zero when the current adjustment circuit is in the zero-crossing phase. The inductor current is larger than zero when the current adjustment circuit is in the energy storage phase and the energy release phase. Energy of the energy storage inductor increases when the current adjustment circuit is in the energy storage phase. Energy of the energy storage inductor drops when the current adjustment circuit is in the energy release phase.

In some embodiments of the present disclosure, one or more charging components are disposed in the charge time sub-circuit 400a. The on time (i.e., conduction time) and the off time (i.e., non-conduction time) of the charge time sub-circuit 400a is adjusted based on controlling charging time (e.g., start time and end time) and a charging period of the one or more charging components. Conduction time and non-conduction time of the current adjustment circuit 10a is adjusted according to the on time (i.e., conduction time) and the off time (i.e., non-conduction time) of the charge time sub-circuit 400a. The average current of the current adjustment circuit 10a can be controlled according to the conduction time and non-conduction time of the current adjustment circuit 10a.

In some embodiments, the charge time sub-circuit 400a may include two capacitor components $C_1$ and $C_2$. The time of $T_{ON}$ and $T_{dmg}$ of the current adjustment circuit 10a is represented as a charging time of $C_1$, and the time of $T_{OFF}$ of the current adjustment circuit 10a is represented as a charging time of $C_2$. For each of the capacitor components, a voltage after a charging process of each of the capacitor components is finished is determined according to the following equation (2):

$$V_{C1} = \frac{I_R}{C_1} \times (T_{ON} + T_{dmg}), \ V_{C2} = \frac{I_R}{C_2} \times T_{OFF}, \quad (2)$$

where $V_{C1}$ refers to a voltage after a charging process of a first capacitor component is finished, ($T_{ON}+T_{dmg}$) refers to a charging time of the first capacitor component, and $C_1$ refers to a capacitance of the first capacitor component. $V_{C2}$ refers to a voltage after a changing process of the second capacitor component is finished. $C_2$ refers to a capacitance of the second capacitor component. $T_{OFF}$ refers to a charging time of the second capacitor component during a switch-off time of the current adjustment circuit 10a. The switch-off time of the current adjustment circuit 10a is expressed as ($T_{dmg}+T_{OFF}$). For the convenience of explanation and simplification of calculation, a same charging current $I_R$ is used to charge the first capacitor component and the second capacitor component, and voltages (i.e., $V_{C1}$ and $V_{C2}$) of the first capacitor component and the second capacitor component is equal to each other. Based on $V_{C1}=V_{C2}$ and equation (2), $T_{OFF}$ is determined according to the following equation (3):

$$T_{OFF} = \frac{C_2}{C_1} \times (T_{ON} + T_{dmg}). \quad (3)$$

The switching cycle of the current adjustment circuit 10a is T:

$$T = T_{ON} + T_{dmg} + T_{OFF} = \left(1 + \frac{C_2}{C_1}\right)(T_{ON} + T_{dmg}). \quad (4)$$

Further, the equation (4) is substituted into the equation (1) to get the average current:

$$I_{AVG} = \frac{1}{2} \times \frac{V_{REF}}{R} \times \frac{T_{ON} + T_{dmg}}{T}. \quad (5)$$

Average current of the inductor is determined according to equation (6):

$$I_{AVG} = \frac{1}{2} \times \frac{V_{REF}}{R} \times \frac{T_{ON} + T_{dmg}}{T} = \quad (6)$$

$$\frac{1}{2} \times \frac{V_{REF}}{R} \times \frac{T_{ON} + T_{dmg}}{\left(1 + \frac{C_2}{C_1}\right)(T_{ON} + T_{dmg})} = \frac{1}{2} \times \frac{V_{REF}}{R} \times \frac{1}{1 + \frac{C_2}{C_1}}.$$

As we can see from the above equation (6), in the current adjustment circuit 10a, the average current of the inductor depends on the threshold voltage, the current sensing resistor, and the capacitance ratio of the first charge capacitor and the second charge capacitor, and be independent of other parameters such as an inductor. The current sensing resistor and the threshold voltage in the current adjustment circuit 10a are fixed values. Therefore, the average current of the current adjustment circuit is adjusted by adjusting the capacitances and ratio of the first charge capacitor and the second charge capacitor. A time period of the current phase and a time period of non-current phase is adjusted by adjusting the ratio of capacitances of the first charge capacitor and the second charge capacitor. Brightness of an LED light source is adjusted by adjusting the average current. Compared with the prior art, dimming consistency of a current adjustment circuit described in the present disclosure is greatly improved.

As shown in FIG. 3, the current adjustment circuit 10 may include a plurality of switching cycles. Each of the switching cycles may include an energy storage phase, an energy release phase, and a zero-crossing phase in sequence. The current adjustment circuit is in a switch-on state or a switch-off state. The energy storage phase is a phase in which the current adjustment circuit 10 may emit light and storage energy. In the energy storage phase, the charge time sub-circuit 400a (the time control sub-circuit 400) is in a first charging state. The dimming switch 200 is in a turned-on state under control of the switch control sub-circuit 300. The lighting sub-circuit 100 is in a switch-on (conduction) state.

Following the energy storage phase, the current adjustment circuit 10 may enter the energy release phase. In the energy release phase, the charge time sub-circuit 400a may continue to be in the first charging state. The dimming switch 200 switches to a turned-off state under control of the switch control sub-circuit 300. The lighting sub-circuit 100 is in a non-conduction state. The lighting sub-circuit 100 is in a switch-off state, and the current of the lighting sub-circuit 100 may gradually drop.

The current adjustment circuit 10 may enter a zero-crossing phase when current of the lighting sub-circuit 100 becomes zero and generates a damped oscillation current and/or voltage across zero and/or hold at zero. The charge time sub-circuit 400a may enter a second charging state, and the dimming switch 200 may remain in the turned-off state under control of the switch control sub-circuit 300.

The zero-crossing phase may end when a charging process of the charge time sub-circuit 400a is finished. The dimming switch 200 is turned on under control of the switch control sub-circuit 300. And after the charge time sub-circuit 400a is discharged and cleared, the current adjustment circuit 10 enters an energy storage phase of a new switching cycle.

The average current of the current adjustment circuit 10 can be adjusted by adjusting a time duration of the zero-crossing phase in the current adjustment circuit. The time duration of the zero-crossing phase can be adjusted by adjusting the charging time of each phase of the charge time sub-circuit.

FIG. 4 is a schematic diagram of a circuit structure illustrating an exemplary current adjustment circuit 10b according to some embodiments of the present disclosure. The current adjustment circuit 10b is an embodiment of the current adjustment circuit 10 shown in FIG. 1 and the current adjustment circuit 10a shown in FIG. 2. The current adjustment circuit 10b may include a lighting sub-circuit 100, a dimming switch 200, a switch control sub-circuit 300, a charge time sub-circuit 400a, and a Zero-crossing detector 500.

The lighting sub-circuit 100 may include a rectifier 110, a light source 120, a diode 130, an energy storage inductor 140, a filter capacitor 150, and a current sensing resistor 160. The light source 120 is an LED light source.

A first end of the light source 120 is connected to the rectifier 110, and a second end of the light source 120 is connected to a first end of the energy storage inductor 140. A second end of the energy storage inductor 140 is connected to the input end of the dimming switch 200. The output end of the dimming switch 200 is connected to the ground through the current sensing resistor 160.

A negative end of the diode 130 is connected to the first end of the light source 120, and a positive end of the diode 130 is connected to the second end of the energy storage inductor 140. Two ends of the filter capacitor 150 are respectively connected to the first end and the second end of the lighting source 120.

A switch-on/switch-off state of the lighting sub-circuit 100 is controlled by closing/opening the dimming switch 200. The dimming switch 200 is a field effect transistor. In some embodiments of the present disclosure, the dimming switch 200 is an N-type field effect transistor switch. But it is merely an example and no intention to be a limitation. In some embodiments, the dimming switch 200 is a P-type field effect transistor switch or another switching device.

Specifically, the first input end of the charge time sub-circuit 400a is connected to the control end of the dimming switch 200, and the second input end of the charge time sub-circuit 400a is connected to the control end of the dimming switch 200 through a zero-crossing detector 500. An output end of the charge time sub-circuit 400a is connected to a first input end of the switch control sub-circuit 300. A second input end of the switch control sub-circuit 300 is connected to the output end of the dimming switch 200 and is specifically connected to a connection point of the dimming switch 200 and the current sensing resistor 160. In other words, the second input end of the switch control sub-circuit 300 is connected to the lighting sub-circuit 100. The second input end of the switch control sub-circuit 300 receives an electrical signal VCS at the connection point of the switch control sub-circuit 300 and the lighting sub-circuit 100. The output of the switch control sub-circuit 300 is connected to the control end of the dimming switch 200.

Correspondingly, in the energy storage phase of each switching cycle, the charge time sub-circuit 400a is in a first charging state. Since the dimming switch 200 is turned on in this stage, the current adjustment circuit 10 is in a conduction phase. The lighting sub-circuit 100 is in a lighting state. The electrical signal VCS of the connection point gradually increases.

When the electrical signal VCS of the connection point rises to the threshold voltage VREF, the dimming switch 200 turns off under the control of the switch control sub-circuit 300, which triggered by the electrical signal VCS, and the current adjustment circuit 10 enters the energy release phase. At this time, since the dimming switch 200 is off, the electrical signal VCS of the connection point is in a zero state. During the energy release phase, the electrical signal VCS of the connection point received by the sub-circuit 300 is a zero level signal.

After the release of the inductive energy of the lighting sub-circuit 100, the lighting sub-circuit 100 is in a zero-crossing state. The zero-crossing detector 500 is configured to output a zero-crossing signal VZCD when an oscillation current or voltage signal is detected. The oscillation current or voltage is generated after energy releasing of the energy storage inductor 140 is finished. The charge time sub-circuit 400a receives the zero-crossing signal VZCD sent by the zero-crossing detector 500, and enters the second charging state. After a charging process of the charge time sub-circuit 400a is finished in the second charging state, the charge time sub-circuit 400a outputs a trigger signal to the switch control sub-circuit 300. The dimming switch 200 is turned on under control of the switch control sub-circuit 300 triggered by the trigger signal. The current adjustment circuit 10 enters an energy storage phase of a new switching cycle.

Figure 5:
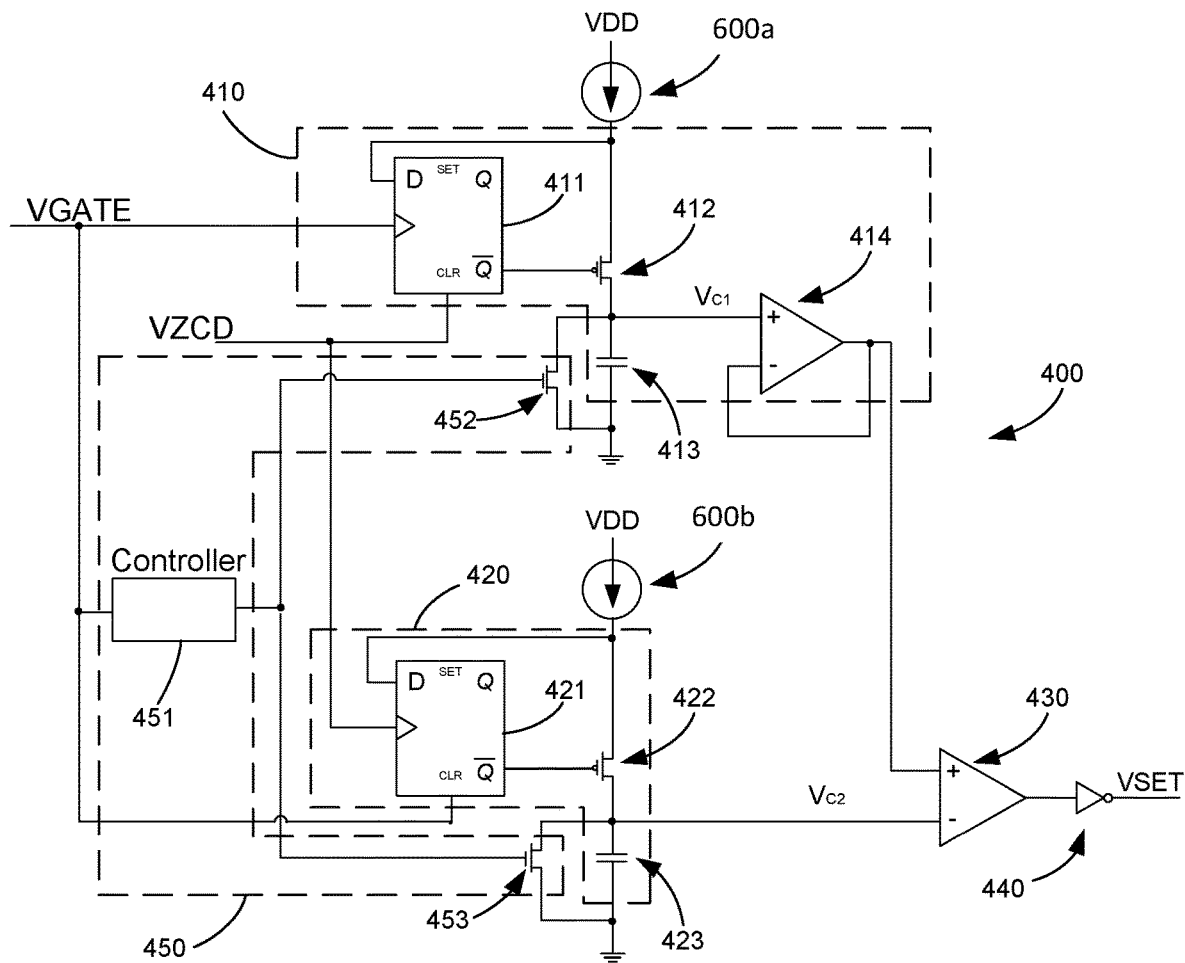
FIG. 5 is a circuit diagram illustrating an exemplary charge time sub-circuit according to some embodiments of the present disclosure.

FIG. 5 is a circuit diagram illustrating an exemplary charge time sub-circuit 400a according to some embodiments of the present disclosure. The charge time sub-circuit 400a is an embodiment of the time control circuit 400. The charge time sub-circuit 400a is implemented in FIGS. 1, 2, and 4. The charge time sub-circuit 400a is connected to a dimming switch 200 and a switch control sub-circuit 300. As shown in FIG. 5, the charge time sub-circuit 400a includes a first dimming charge branch 410, a second dimming charge branch 420, a first comparator 430, a signal inverter 440, and a discharge sub-circuit 450.

The first dimming charge branch 410 includes a first input end, a second input end, and an output end. The first input end of the first dimming charge branch 410 is connected to a control end of the dimming switch 200 (VGATE). The second input end of the first dimming charge branch 410 is connected to a control end of the dimming switch 200 through a zero-crossing detector 500 (VZCD). The output end of the first dimming charge branch 410 is connected to a positive end of the first comparator 430 through an operational amplifier 414, which configured as a buffer.

The second dimming charge branch 420 includes a first input end, a second input end, and an output end. The first input end of the second dimming charge branch 420 is connected to the control end of the dimming switch 200 through the zero-crossing detector 500 (VZCD). The second input end of the second dimming charge branch 420 is connected to the control end of the dimming switch 200 (VGATE). The output of the second dimming charge branch 420 is connected to a negative end of the first comparator 430.

An output of the first comparator 430 is connected to an input end of the signal inverter 440. An output end of the signal inverter 440 is an output end of the charge time sub-circuit 400a (VSET). The output end of the signal inverter 440 is connected to a first input end of the switch control sub-circuit 300.

The first dimming charge branch 410 may include a first flip-flop 411, a first switch 412, a first charge capacitor 413, and an operational amplifier 414, which configured as a buffer.

The first flip-flop 411 includes a signal input end, a trigger end, a reset end, and an output end. The signal input end of the first flip-flop 411 is connected to a current source 600a (e.g., VDD). The trigger end of the first flip-flop 411 is the first input end of the first dimming charge branch 410 (VGATE). The trigger end of the first flip-flop 411 is connected to the control end of the dimming switch 200. The reset end (e.g., CLR) of the first flip-flop 411 is the second input end of the first dimming charge branch 410 (VZCD). The reset end of the first flip-flop 411 is connected to the zero-crossing detector 500. The output end of the first flip-flop 411 is connected to a control end of the first switch 412.

An input end of the first switch 412 is connected to the current source 600a. An output end of the first switch 412 is connected to ground through a first charge capacitor 413.

The operational amplifier 414 includes a positive end, a negative end, and an output end. The positive end of the operational amplifier 414 is connected to the output end of the first switch 412. The negative end of the operational amplifier 414 is connected to the output end of the operational amplifier 414 to form a unity gain buffer. The output end of the operational amplifier 414 is the output end of the first dimming charge branch 410. The output end of the operational amplifier 414 is connected to the positive end of the first comparator 430.

The operational amplifier 414 is configured to buffer and isolate the electrical signal ($V_{C1}$), which is outputted by the first charge capacitor 413.

The second dimming charge branch 420 may include a second flip-flop 421, a second switch 422, and a second charge capacitor 423.

The second flip-flop 421 includes a signal input end, a trigger end, a reset end, an output end. The signal input end (e.g., D) of the second flip-flop 421 is connected to the current source 600b. The trigger end of the second flip-flop 421 is the first input end of the second dimming charge branch 420. The trigger end of the second flip-flop 421 is connected to the control end of the dimming switch 200 through the zero-crossing detector 500 (VZCD). The reset end of the second flip-flop 421 is the second input end of the second dimming charge branch 420. The reset end of the second flip-flop 421 is connected to the control end of the dimming switch 200 (VGATE). The output end of the second flip-flop 421 is connected to the control end of the second switch 422.

In some embodiments, the current source 600b is connected to the signal input end of the second flip-flop 421. The current source 600a is connected to the signal input end of the first flip-flop 411. The current source 600a and the current source 600b are the same current source or different current sources.

An input end of the second switch 422 is connected to the current source 600b. An output end of the second switch 422 is connected to the ground through the second charge capacitor 423. The output end of the second switch 422 is the output end of the second dimming charge branch 420. The output end of the second switch 422 is connected to the negative end of the first comparator 430.

The comparator 430 is configured to compare two electrical signals (e.g., two voltages, or two currents) and outputs a digital signal indicating which is larger. For example, the comparator 430 is configured to compare an output signal of the first dimming charge branch 410 and the output signal of the second dimming charge branch 420. In some embodiments, the negative end of the first comparator 430 is connected to the output end of the first dimming charge branch 410. The positive end of the first comparator 430 is connected to the output of the second dimming charge branch 420.

Figure 6:
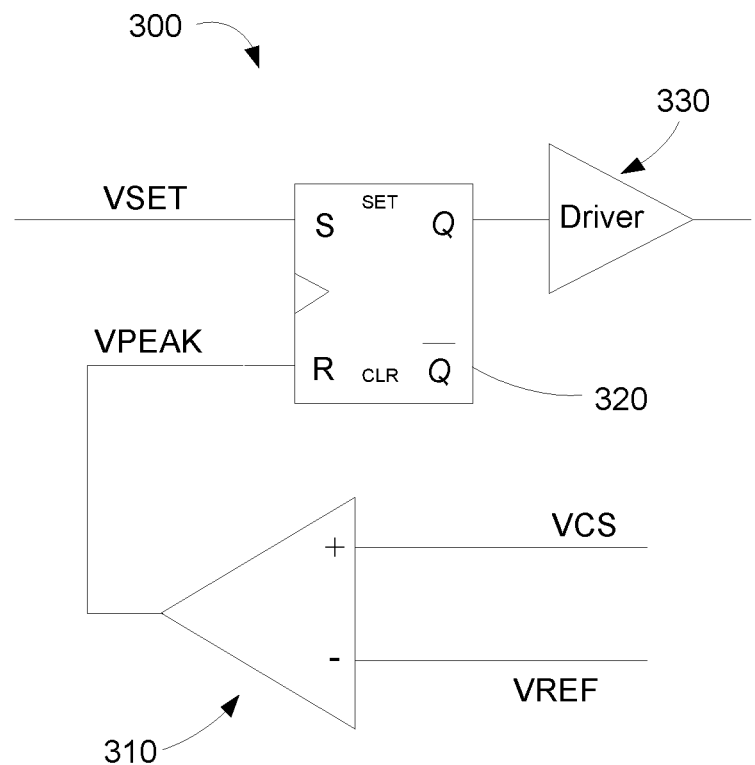
FIG. 6 is a circuit diagram illustrating an exemplary switch control sub-circuit according to some embodiments of the present disclosure.

FIG. 6 is a circuit diagram illustrating an exemplary switch control sub-circuit 300 according to some embodiments of the present disclosure. The switch control sub-circuit 300 is used in FIGS. 1, 2, and 4. The switch control sub-circuit 300 includes a second comparator 310, a third flip-flop 320, and a driver 330.

The second comparator 310 may include a positive input end, a negative input end, and an output end. The positive end of the second comparator 310 is connected to a connection point of an output end of the dimming switch 200 and a current sensing resistor 160. The second comparator 310 may receive an electrical signal VCS of the connection point. The negative end of the second comparator 310 is connected to a circuit to receive a threshold voltage signal VREF. The output end of the second comparator 310 is connected to a first input end of the third flip-flop 320. In some embodiments of the present disclosure, the threshold voltage signal VREF is a peak voltage of the current adjustment circuit 10.

The third flip-flop 320 may include a first input end, a second input end, and an output end. The second input end of the third flip-flop 320 is connected to an output end of a charge time sub-circuit 400a (i.e., a time control sub-circuit 400). That is to say, the second input end of the third flip-flop 320 is connected to the output end of a signal inverter 440 (VSET). The output end of the third flip-flop 320 is connected to the driver 330. An output end of the driver 330 is connected to a control end of the dimming switch 200.

As shown in FIG. 5, the first charging branch 410 is in a first charging state in an energy storage phase. The trigger end of the first flip-flop 411 is triggered by the control end signal (e.g., VGATE) of the dimming switch 200. The output end of the first flip-flop 411 outputs a first level signal by receiving a signal from the current source 600a through the signal input end of the first flip-flop 411. The first switch 412 is turned on under the control of the first level signal. The first charge of capacitor 413 is charged. The operational amplifier 414 receives a voltage signal $V_{C1}$ of the first charge capacitor 413 and output an equipotential signal. The equipotential signal is the same as the voltage signal $V_{C1}$ of the first charge capacitor 413 in magnitude. The equipotential signal may rise with a charging process of the first capacitor 413 until the charging process is finished (Refer to FIG. 3). Then, the potential signal $V_{C1}$ is held steadily. In this state, the first dimming charge branch 410 outputs a level signal that is equal to $V_{C1}$. The second dimming charge branch 420 is off and output a zero-level signal $V_{C2}$. Then the first comparator 430 outputs a high-level signal. The signal inverter 440 outputs a low-level signal by inverting the high-level signal of the first comparator 430. When the connection point signal VCS rises to a threshold voltage $V_{REF}$ of the current adjustment circuit 10, the second comparator 310 outputs a high-level signal (VPEAK). The threshold voltage is a peak voltage of the current adjustment circuit 10. The output end of the third flip-flop 320 outputs a low-level driving signal under the control of the high-level reset signal. The dimming switch 200 is turned off under the control of the driver 330 with the low-level driving signal. Then, the current adjustment circuit 10 enters an energy release phase. Current in the current adjustment circuit 10 gradually decreases. The first dimming charge branch 410 is still in the first charging state. At this time, an electrical signal VCS of the connection point received by the positive end of the second comparator 310 becomes zero levels again, and the output end of the second comparator 310 is changed to low-level again. After energy releasing of the energy storage inductor 140 is finished, the zero-crossing detector 500 outputs a trigger signal VZCD and the current adjustment circuit enters a zero-crossing phase. In the zero-crossing phase, the first charging state ends, the second charging state begins, and the second charging branch 420 is in a charging state.

In the zero-crossing phase, the trigger end of the second flip-flop 421 is triggered by the trigger signal VZCD outputted by the zero-crossing detector 500. The output end of the second flip-flop 421 outputs a second level signal. The second switch 422 is turned on under the control of the second level signal. The second charge capacitor 423 is charged. The second dimming charge branch 420 is turned on and outputs a level signal until a charging process of the second charge capacitor 423 is finished. The level signal is equal to a voltage signal $V_{C2}$ of the second charge capacitor 423. At the end of the second charge state, the level signal $V_{C2}$ outputted by the second dimming charge branch 420 is larger than the level signal $V_{C1}$ outputted by the first dimming charge branch 410. The second dimming charge branch 420 is connected to the negative input end of the first comparator 430, that causes the output of the first comparator 430 instantly changed from a high-level signal to a low-level signal. The output signal VSET of the signal inverter 440 is changed from a low-level signal to a high-level signal, that is, the trigger signal for the third flip-flop 320. The second input end of the third flip-flop 320 receives the trigger signal outputted by the charge time sub-circuit 400a, and outputs a high-level driving signal. The dimming switch 200 turned on under the control of the driver 330 driven by the high-level driving signal, thereby an energy storage phase of the next switching cycle begins.

In some embodiments, the first switch 412 and/or the second switch 422 may include but not limited to P-type field effect transistor switch (positive channel metal Oxide Semiconductor, PMOS). In some embodiments, the first switch 412 and/or the second switch 422 may also be an N-Metal-Oxide-Semiconductor (NMOS) or other switches.

In some embodiments, the first flip-flop 411 and/or the second flip-flop 421 is D flip-flop. Correspondingly, the first level signal and/or the second level signal is a low-level signal. It is further noted that although the illustrative embodiment was described with the D flip-flop, those skilled in the art and having the benefit of the present disclosure will recognize that other flip-flop may be used, and the present invention is not limited to use with a D flip-flop. For example, RS flip-flop, JK flip-flop, or T flip-flop may be used in some embodiments.

In some embodiments of the present disclosure, the third flip-flop 320 is but not limited to an RS flip-flop. The third flip-flop 320 may also be other types of flip-flop (e.g., D flip-flop, JK flip-flop, or T flip-flop). The first input end of the third flip-flop 320 is the R input end of the RS flip-flop, and the second input end of the third flip-flop 320 is the S input end of the RS flip-flop.

It should be noted that the above descriptions of the charge time sub-circuit 400a and the switch control sub-circuit 300 are intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the charge time sub-circuit 400a and/or the switch control sub-circuit 300 may include one or more additional components. Additionally or alternatively, one or more components of the charge time sub-circuit 400a and/or the switch control sub-circuit 300 described above may be omitted. For example, the operational amplifier 414 may be omitted.

The entire workflow is explained with reference to FIG. 7. In the zero-crossing phase $T_{OFF}$, the reset end of the D flip-flop 411 performs a signal reset under the trigger of the trigger signal VZCD outputted by the zero-crossing detector 500. An output end $\overline{Q}$ of the D flip-flop 411 outputs a high level reset signal. The first switch 412 is turned off. The first charge capacitor 413 stops being charged, and maintains a level signal $V_{C1}$ when the charging stopped. The operational amplifier 414 outputs a signal equal to the level signal $V_{C1}$ when the first charge capacitor 413 stops being charged. At the same time, the output end $\overline{Q}$ of the D flip-flop 421 outputs a low-level signal under the trigger of the trigger signal VZCD. The second switch 422 is turned on under control of the low-level signal outputted by the D flip-flop 421. The second dimming charge branch 420 is in a conduction state and enters the second charging state. The second charge capacitor 423 is gradually charged, and outputs a gradually increasing level signal $V_{C2}$ until the level signal $V_{C2}$ is larger than the level signal $V_{C1}$ outputted by the operational amplifier 414. The output signal of the first comparator 430 is changed from a high-level signal to a low-level signal and the output signal VSET of the signal inverter 440 is changed form from a low level to a high-level pulse signal. The S end of an RS flip-flop 320 receives the pulse signal VSET and outputs a high-level driving signal. The dimming switch 200 is turned on under the control of the driver 330 driven by the high-level driving signal. The current adjustment circuit 10 enters an energy storage phase $T_{ON}$ of a next switching cycle.

In the energy storage phase $T_{ON}$, the reset end of the D flip-flop 421 performs a signal reset under a trigger of the control end signal VGATE of the dimming switch 200, thereby an output end $\overline{Q}$ of the second flip-flop 421 outputs a high level reset signal. The second switch 422 is turned off, and the second dimming charge branch 420 is in a non-conduction state and output a zero level signal. When a connection point signal VCS rises to a threshold voltage $V_{REF}$ of the current adjustment circuit 10, i.e., rises to a peak voltage, the second comparator 310 outputs a high-level signal VPEAK. After receiving the high-level signal VPEAK, the R end of the RS flip-flop 320 outputs a low-level driving signal. The dimming switch 200 is turned off under control of the driver 330 driven by the low-level driving signal. The current adjustment circuit 10 enters the energy release phase $T_{dmg}$. At this time, the connection point electrical signal VCS received by the positive end of the second comparator 310 becomes zero level again, and the output of the second comparator 310 is changed to a low level again. When the inductor current gradually decreases to zero and produces a damped oscillation, the zero-crossing detector 500 outputs a trigger signal VZCD. The current adjustment circuit enters the zero-crossing phase $T_{OFF}$.

Figure 8:
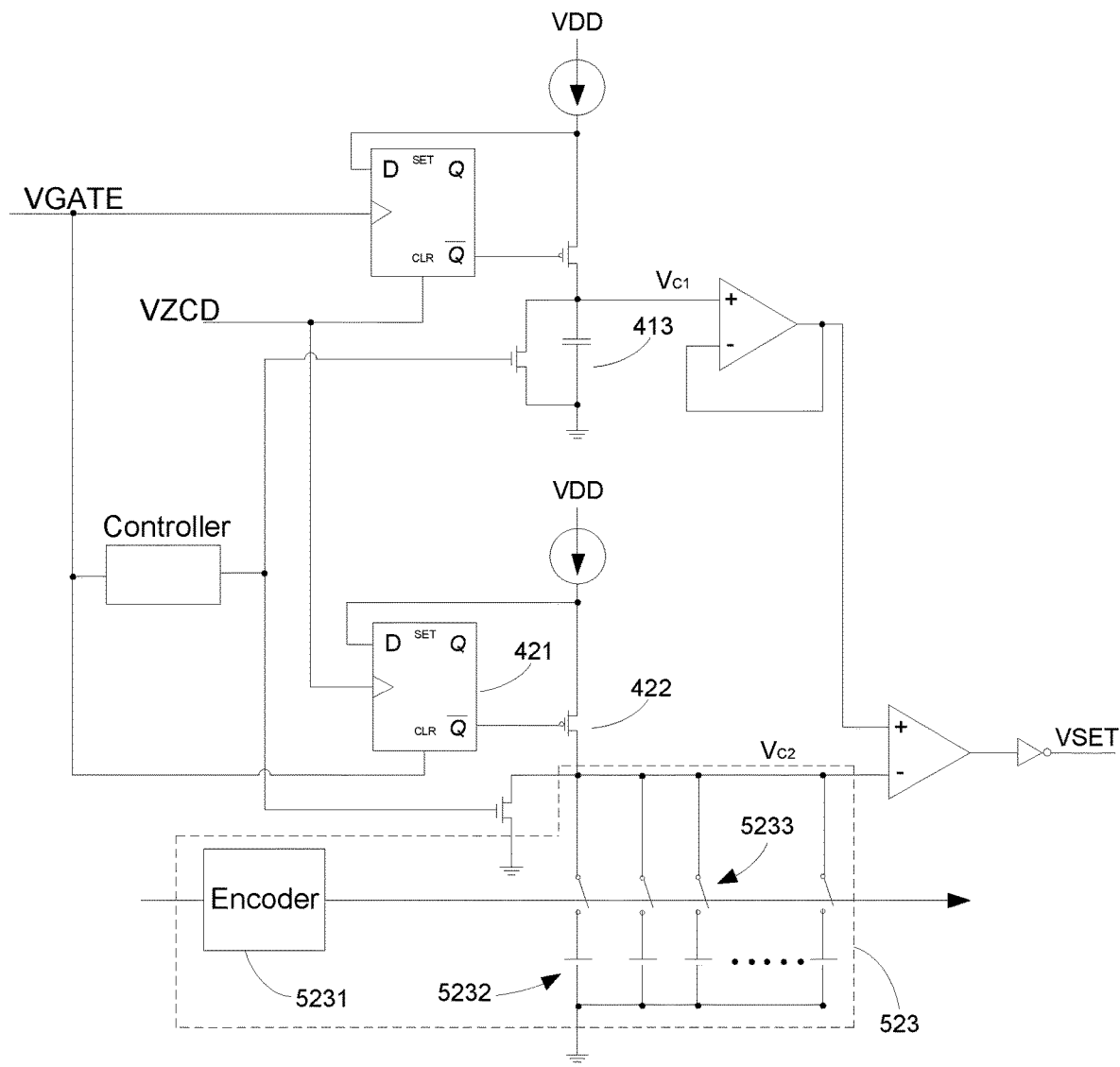
FIG. 8 is a circuit diagram of another exemplary charge time sub-circuit according to some embodiments of the present disclosure.

In some embodiments of the present disclosure, the second charge capacitor 423 is a single fixed value capacitor. It should be understood that, it is merely an example and no intention to be limited. FIG. 8 is a circuit diagram of an exemplary charge time sub-circuit according to some embodiments of the present disclosure. A circuit shown in FIG. 8 is an embodiment of charge time sub-circuit 400a. The charge time sub-circuit shown in FIG. 8 is different from the charge time sub-circuit shown in FIG. 5 is that: the second charge capacitor 523 is a variable capacitor array, and the second charge capacitor 523 includes a plurality of capacitor branches in parallel and an encoder 5231.

Each of the plurality of capacitor branches includes a branch capacitor 5232 and a branch switch 5233. In each of the plurality of capacitor branches, one end of the branch capacitor 5232 is connected to ground, and the other end of the branch capacitor 5232 is connected to an output end of the second switch 422 through the branch switch 5233.

The encoder 5231 is respectively connected to the branch switch 5233 in each of the plurality of capacitor branches. The encoder 5231 is configured to respectively control the disconnection or connection of each branch switch 5233 to control the capacitance of the second charge capacitor 523.

In this way, one or more branch capacitors 5232 is selected as the second charge capacitor 523 by closing one or more branch switches 5233 according to actual needs. The capacitance of the second charge capacitor 523 is adjusted by the selection. Further, a ratio of the capacitance of the first charge capacitor 413 to the second charge capacitor 523 is adjusted, and a magnitude of the average current of the inductor in each switching cycle is adjusted, thereby brightness of the light source 120 is adjusted.

Further, referring to FIG. 5, the charge time sub-circuit 400a may further include a discharge sub-circuit 450. The discharge sub-circuit 450 includes a controller 451, a third switch 452, and a fourth switch 453.

An input end of the controller 451 is connected to a control end of the dimming switch 200 (VGATE), and an output end of the controller 451 is respectively connected to a control end of the third switch 452 and a control end of the fourth switch 453.

An input end of the third switch 452 is connected to a connection point between an output end of the first switch 412 and a first end of the first charge capacitor 413. An output end of the third switch 452 is connected to a connection point between the second end of the first charge capacitor 413 and ground. Thus, the third switch 452 is connected to the two ends of the first charge capacitor 413.

An input end of the fourth switch 453 is connected to a connection point between an output end of the second switch 422 and a first end of the second charge capacitor 423, and an output end of the fourth switch 453 is connected to a connection point between the second end of the second charge capacitor 423 and the ground. Thus, the fourth switch 453 is connected to the two ends of the second charge capacitor 423.

Correspondingly, when the dimming switch 200 is switched from an off state to an on state at an end of each switching cycle, the controller 451 receives a trigger signal VGATE outputted by the dimming switch 200, wherein the trigger signal VGATE changes from a low-level signal to a high-level signal. The third switch 452 and the fourth switch 453 are turned on under control of the controller 451 triggered by the trigger signal VGATE. The first charge capacitor 413 and the second charge capacitor 423 are discharged. At the beginning of each charging cycle, voltages in the first dimming charge branch 410 and the second dimming charge branch 420 are cleared instantaneously.

The current adjustment circuit provided by the embodiment of the present disclosure provides a charge time sub-circuit and a switch control sub-circuit, thereby adding a zero-crossing phase in the switching period. By setting or adjusting the capacitance and ratio of the two capacitors in the charge time sub-circuit, the time of the zero-crossing period in the switching cycle of the current adjustment circuit is adjusted. Thereby the switching cycle period is adjusted, thereby the average output current of the current adjustment circuit is adjusted. Further, the brightness of the lighting source is adjusted. The implementation method may reduce or eliminate the influence of factors such as circuit parasitic parameters on the light source, ensure the consistency of each light source, and optimize the display effect of the LED light source.

Embodiment 2

Figure 9:
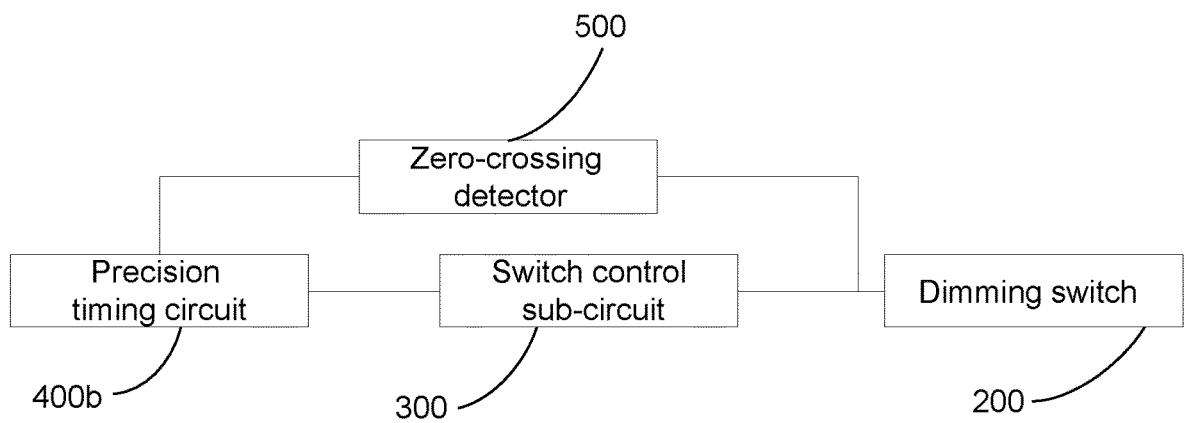
FIG. 9 is a partial connection structure diagram of an exemplary current adjustment circuit according to some embodiments of the present disclosure.

Reference to FIG. 9, the current adjustment circuit works in a timing operation mode. The time control sub-circuit includes a precision timing circuit for outputting a control signal to the switch control sub-circuit. The dimming switch is turned on or turned off according to the received control signal of the switch control sub-circuit.

Specifically, the time control sub-circuit is a precision timing circuit 400b. A time threshold is internally set in a precision timing unit for representing a time duration of the zero-crossing phase in the current adjustment circuit. An input end of the precision timing circuit 400b is connected to an output of the zero-crossing detector 500, and an output of the precision timing circuit 400b is connected to an input of the switch control sub-circuit 300.

In actual operation, each time the trigger signal VZCD outputted by the zero-crossing detector 500 is received, the precision timing circuit 400b starts to count. The precision timing circuit 400b does timekeeping according to the set time threshold. After the timekeeping is over, the precision timing circuit 400b transmits a control signal for notifying the switch control sub-circuit 300 to turn on the dimming switch 200. After timekeeping is finished for each cycle, the precision timing circuit 400b is reset and waits for a next trigger signal VZCD.

It should be understood that, the precision timing circuit 400b may not work during an energy storage phase and an energy release phase. Implementation circuit of the switch control sub-circuit refers to embodiment 1 and will not be repeated here. The specific implementation of the precision timing circuit 400b may employ a timer or a counter.

The embodiment 2 of the present disclosure may control time period of the zero-crossing phase by setting a preset time threshold using a precision timing circuit, thereby controlling the average current of the current adjustment circuit. There is no excessive parasitic interference factor in the whole operation process, thus ensuring the consistency of each light source.

Finally, it should be noted that the above-mentioned embodiments are merely exemplary embodiments of the present disclosure, and are used to explain the technical solutions of the present disclosure but not limited thereto. The scope of protection of the present disclosure is not limited thereto, although the present disclosure has described in detail with reference to the foregoing embodiments. It should be understood: any person skilled in the art may revise the technical solutions described in the foregoing embodiments or may easily make changes in the technical scope disclosed in the present disclosure, or equivalently replace some of the technical features. Such modifications, changes, and substitutions do not depart from the spirit and scope of the technical solutions of the present disclosure, and should be covered by the scope of the present disclosure. Therefore, the scope of protection of the present disclosure should be subject to the scope of the claims.

We claim:

1. A current adjustment circuit, wherein:
the current adjustment circuit comprises a lighting sub-circuit, a dimming switch, a switch control sub-circuit connected to the dimming switch and the lighting sub-circuit, and a time control sub-circuit connected to the switch control sub-circuit;
the time control sub-circuit is configured to determine a first preset time period and a second preset time period, wherein
in the first time period, the current adjustment circuit is in a first state and current flow of the lighting sub-circuit is oscillating around zero and/or hold at zero;
in the second time period, the current adjustment circuit is in a second state and the current flow of the lighting sub-circuit is larger than zero; and
the dimming switch is configured to control the current adjustment circuit to switch from the first state to the second state by switching from a switch-off state to a switch-on state.

2. The current adjustment circuit of claim 1, wherein an average current flow of the lighting sub-circuit is adjusted by adjusting a ratio of the first preset time period and the second preset time period.

3. The current adjustment circuit of claim 1, wherein the first preset time period is a time period when the current adjustment circuit is in a zero-crossing phase of a switching cycle.

4. The current adjustment circuit of claim 3 further comprises a zero-crossing detector, wherein the time control sub-circuit is a charge time sub-circuit,
the zero-crossing detector is connected to the charge time sub-circuit and the switch control sub-circuit,
the zero-crossing detector is configured to send a trigger signal starting the first preset time period from a start time of the zero-crossing phase; and
the switch control sub-circuit is configured to turn on the dimming switch after the first preset time period.

5. The current adjustment circuit of claim 4, wherein the second preset time period is a sum of a time period when the current adjustment circuit is in an energy storage phase of the switching cycle and a time period when the current adjustment circuit is in an energy release phase of the switching cycle.

6. The current adjustment circuit of claim 5, wherein the lighting sub-circuit includes an energy storage inductor,
a current of the energy storage inductor is oscillating around zero when the current adjustment circuit is in the zero-crossing phase;
energy of the energy storage inductor is storing when the current adjustment circuit is in the energy storage phase; and
energy of the energy storage inductor is releasing wherein the current adjustment circuit is in the energy release phase.

7. The current adjustment circuit of claim 1, wherein the time control sub-circuit is a charge time sub-circuit,
the charge time sub-circuit includes a first charge capacitor and a second charge capacitor, and
the first preset time period and the second preset time period is determined based on a charging process and/or a discharging process of the first charge capacitor and the second charge capacitor.

8. The current adjustment circuit of claim 7, wherein the first charge capacitor and/or the second charge capacitor includes one or more capacitor branches in parallel.

9. The current adjustment circuit of claim 7, wherein the first charge capacitor is disposed in a first capacitor branch and the second charge capacitor is disposed in a second capacitor branch, the current adjustment circuit further comprises a comparator, the comparator is connected to the first capacitor branch and the second capacitor branch, and the comparator is configured to determine a level signal based on an output signal of the first capacitor branch and an output signal of the second capacitor branch.

10. The current adjustment circuit of claim 1, wherein the time control sub-circuit is a precision timing circuit for timing or counting the first time period and the second time period.

11. A method for controlling a current adjustment circuit, wherein:

the current adjustment circuit comprises a lighting sub-circuit, a dimming switch, a switch control sub-circuit connected to the dimming switch, and a time control sub-circuit connected to the switch control sub-circuit, the method comprises:

determining a first preset time period and a second preset time period, wherein in the first time period, the current adjustment circuit is in a first state and current flow of the lighting sub-circuit is oscillating around zero and/or hold at zero;

in the second time period, the current adjustment circuit is in a second state and the current flow of the lighting sub-circuit is larger than zero; and controlling the current adjustment circuit switches from the first state to the second state by switching the dimming switch from a switch-off state to a switch-on state.

12. The method of claim 11 further comprises:

adjusting an average current flow of the current adjustment circuit by adjusting a ratio of the first preset time period and the second preset time period.

13. The method of claim 11, wherein the first preset time period is a time period when the current adjustment circuit is in a zero-crossing phase of a switching cycle.

14. The method of claim 13, wherein the current adjustment circuit includes a zero-crossing detector, the time control sub-circuit is a charge time sub-circuit, the zero-crossing detector is connected to the charge time sub-circuit and the switch control sub-circuit, the zero-crossing detector is configured to send a trigger signal starting the first preset time period from a start time of the zero-crossing phase; and the switch control sub-circuit is configured to turn on the dimming switch after the first preset time period.

15. The method of claim 14, wherein the second preset time period is a sum of a time period when the current adjustment circuit is in an energy storage phase of the switching cycle and a time period when the current adjustment circuit is in an energy release phase of the switching cycle.

16. The method of claim 15, wherein the lighting sub-circuit includes an energy storage inductor, a current of the energy storage inductor is oscillating around zero when the current adjustment circuit is in the zero-crossing phase;

energy of the energy storage inductor is storing when the current adjustment circuit is in the energy storage phase; and energy of the energy storage inductor is releasing where the current adjustment circuit is in the energy release phase.

17. The method of claim 11, wherein the time control sub-circuit is a charge time sub-circuit, the charge time sub-circuit includes a first charge capacitor and a second charge capacitor, and the first preset time period and the second preset time period is determined based on a charging process and/or a discharging process of the first charge capacitor and the second charge capacitor.

18. The method of claim 17, wherein the first charge capacitor and/or the second charge capacitor includes one or more capacitor branches in parallel.

19. The method of claim 17, wherein the first charge capacitor is disposed in a first capacitor branch and the second charge capacitor is disposed in a second capacitor branch, the current adjustment circuit further comprises a comparator, the comparator is connected to the first capacitor branch and the second capacitor branch, and the comparator is configured to determine a level signal based on an output signal of the first capacitor branch and an output signal of the second capacitor branch.

20. The method of claim 11, wherein the time control sub-circuit is a precision timing circuit for timing or counting the first time period and the second time period.

* * * * *